UNITED STATES PATENT OFFICE 2,689,834

COPOLYMERS OF VINYL COMPOUNDS, POLYPHENYLETHER ALCOHOLS, AND UNSATURATED FATTY ACIDS

John W. McNabb, Cedarhurst, N. Y., assignor of one-half to American Can Company, New York, N. Y., a corporation of New Jersey, and one-half to Kienle and Company, Brooklyn, N. Y., a corporation of New York No Drawing. Application May 19, 1952, Serial No. 288,758

2 Claims. (Cl. 260—23)

This invention relates to copolymers of vinyl compounds and resinous esters of polymeric polyhydric alcohols and more particularly has reference to copolymers of vinyl compounds, resinous polyphenylether alcohols and unsaturated monobasic organic acids.

An object of the invention is the provision of new and novel copolymers of vinyl compounds, resinous polyphenylether alcohols and unsaturated monobasic acids, their methods of preparation and articles coated with the copolymers.

Another object is the provision of copolymers of vinyl compounds, resinous polyphenylether alcohols and unsaturated monobasic organic acids, which copolymers are characterized by vastly improved steam, water, and alkali resistance, excellent flexibility of dried films, and exceptional adhesive qualities.

Another object is the provision of new organic coating compositions that are especially useful for application to metal surfaces, such as tin plate, black iron plate, tern plate, aluminum plate, etc. used in the manufacture of metal containers.

Numerous other objects and advantages of the invention will be apparent as it is better understood from the following description which is of a preferred embodiment thereof.

These objects are accomplished by forming a copolymer comprising an aliphatic or aromatic vinyl compound, a resinous alcohol formed by reacting a polyphenol with an epihalohydrin or a polyepoxy compound and a monobasic, unsaturated carboxylic acid having from 12 to 22 carbon atoms.

Dried films of my copolymers have properties that are considerably different from those of polymers formed from the individual reactants. For example, polymers of aliphatic vinyl compounds such as polyvinyl chloride, copolymers of vinyl chloride and vinyl acetate, polyvinyl acetate, polyvinyl alcohol and the methacrylate ester polymers, either decompose on heating to high temperatures or soften to such an extent that their use on metal containers is limited to cans which are not intended to receive a high heat treatment after fabrication. Other shortcomings of the individual polymers are generally well known to those familiar with the metal can manufacturing art. Polymers of aromatic vinyl compounds, such as polystyrene, have poor adhesive qualities, are excessively softened by temperature to which containers are frequently exposed and usually produce films that are too inflexible for general use on containers. It is usually very difficult to produce desired characteristics in a coating material containing vinyl polymers because of the very limited compatibility of these polymers with modifying ingredients.

Varnishes made from drying and semi-drying oils have very low alkali and fat resistance.

Polymers formed by reacting a polyphenol with an epihalohydrin, in accordance with the teachings of Patent 2,324,483, or polyepoxy compounds, as described in Patent 2,503,726, are thermosetting and become too brittle for use in container manufacture. For the purpose of brevity the resins of the type described in these two patents are hereinafter referred to as "resinous polyphenylether alcohols."

Patent 2,456,408 discloses fatty acid esters of resinous polyphenylether alcohols, and includes esters of unsaturated carboxylic acids. These polymers are not sufficiently heat or fat resistant for use in packing fat containing products such as meats. Polymers of unsaturated acids of the type described in this patent are useful, however, as starting materials for my new compositions.

There is no film-forming material at present that has general usefulness for coating sheet metal that is to be fabricated into containers. It is common knowledge that a great variety of products having widely divergent characteristics are packaged in metal containers, and the characteristics of the product, or the treatment to which the container is subjected after packing, usually dictates the type of protective layer used on the metal. Thus, the coating materials that are tailored for one group of products are totally unfit for another series of products. My compositions can be used as either an inside or outside coating for packaging products that are quite alkaline, that contain large amounts of fat, or are given a severe heat treatment after packing.

There are at least three broad methods for preparing my new and novel compositions. In one process I first esterify a resinous polyphenylether alcohol with an unsaturated aliphatic acid and then react the polyester thus formed with a vinyl monomer. In the second method I partially esterify a resinous polyether alcohol with an unsaturated aliphatic acid, then vinylate the partial ester and thereafter complete the esterification reaction. The third general procedure is to first react the unsaturated aliphatic acid with a vinyl monomer, and then esterify the vinylated acid with the polyphenylether alcohol. Details for each of these methods will be brought out hereinafter.

The examples of my compositions and their methods of preparation which follow are intended to exemplify, but not to limit, my invention.

A. Preparation of resinous polyphenylether alcohols

Resinous polyphenylether alcohols can be prepared in accordance with the following general reaction:

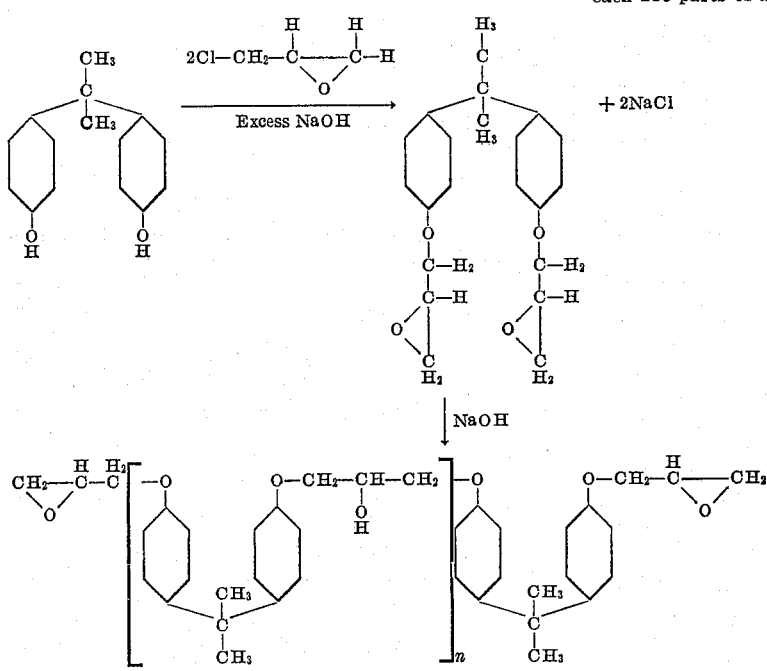

2,2-bis (p-hydroxyphenyl) propane (commonly termed bisphenol A) is reacted with at least 2 molar equivalents of an epihalohydrin, such as epichlorohydrin, in the presence of an excess of alkali to form an epoxy ether derivative of the bisphenol. The epoxy ether derivative is polymerized under the influence of heat and alkali to produce a resinous material having a multiplicity of aliphatic secondary hydroxyl groups and terminal epoxy groups. Resinification of the epoxy ether derivative of the bisphenol can be effected without isolating the monomer by maintaining the alkali concentration at a catalytic level and heating the reaction products. The polymer is a resinous polyphenylether alcohol having a series of alternating aromatic nuclei substantially free of unreacted hydroxyl groups connected to alternate aliphatic chains through ether linkages. In this example the aromatic nucleus is the bisphenol part of the molecule. Each aliphatic ether chain contains at least one hydroxyl or epoxy group as the sole reactive group. In the resinous polyphenylether alcohol the letter $n$ represents an integer greater than 1. Resins of this type are available commercially from Shell Chemical Company under the name of Epon resins. The resin need not be the reaction product of bisphenol A and epichlorohydrin. Other resins of this same genus described in Patents 2,324,483 and 2,503,726 can be substituted.

B. Preparation of esters of resinous polyphenylether alcohols

In this and subsequent examples, the portions specified are by weight, unless otherwise designated.

B1.

| Ingredient: | Parts by weight |
|---|---|
| Resinous polyphenylether alcohol[1] | 696 |
| Dehydrated castor oil acids[2] | 1120 |

[1] The resinous polyphenylether alcohol was a reaction product of 2,2 bis-(p-hydroxyphenyl) propane and epichlorohydrin. It had a molecular weight of 1400–1600, a melting point of 97–103° C., as calculated by Durran's mercury method and an epoxide equivalent of 905–985. Epoxide equivalent equals the grams of resin containing an equivalent of epoxide.
[2] The fatty acids had an equivalent weight of 280. It was calculated that 174 parts of resin were required for each 280 parts of acid for complete esterification.

These materials were charged into a flask and heated to 245° C. under a blanket of inert gas until a constant acid value was reached. This took about 4 hours for completion. The water of esterification was removed by entrapment in a Stark and Dean unit attached to a condenser. The cooled product has an acid value of 30, a Gardner (1933) color of 5.5 in a 75% solids solution in Solvesso 150, a Gardner-Holdt viscosity of Z–3 to Z–4 in the same solution, and a refractive index of 1.5250. In all subsequent examples the viscosity was determined by the Gardner-Holdt method, and the color was graded in accordance with Gardner 1933 Standards.

B2. A similar esterification procedure was followed with the same unsaturated fatty acids as in Example B1 and a poly phenylether alcohol resin having a molecular weight of 850–950, a melting point of 64–76° C. and an epoxide equivalent of 450–525. It was calculated that 132 parts of resin were required for each 280 parts of acids for complete esterification.

| Ingredient: | Parts by weight |
|---|---|
| Resinous polyphenylether alcohol | 528 |
| Dehydrated castor oil acids | 1120 |

The reaction was considered complete after four hours at 245° C. The cooled polyester had an acid value of 35.1, a color of 7.5 as determined from a 75% solution in Solvesso 150 and a viscosity of W in the same solution, and a refractive index of 1.5146.

It is to be understood that other monobasic, unsaturated aliphatic, or aralkyl acids may be substituted for the dehydrated castor oil acids. The unsaturation can be conjugated or non-conjugated. Specific examples are oiticica, soybean, cotton seed, linseed, tung or other unsaturated vegetable or animal fatty acids. Unsaturated, monobasic fatty acids having from 12 to about 22 carbon atoms can be used.

C. *Reacting vinyl compounds with esters of polyphenylether alcohols*

Reaction carried out in solution in a substantially inert solvent.

In the examples which follow, the resinous polyester formed by reacting dehydrated castor oil acids with a resinous polyphenylether alcohol formed by reacting bisphenol A and epichlorohydrin was employed. The resin was dissolved in a relatively inert solvent, Solvesso 150, in a four-necked flask fitted with a variable speed mechanical stirrer, a thermometer, a Stark and Dean trap to which a water cooled condenser was attached, and feeding means for adding dropwise a vinyl compound mixed with a polymerization catalyst. The addition of the vinyl compound was controlled, so that it required about 3 hours for completion. The reaction temperature was held at about 145° C. when monomeric styrene was used as one of the reacting ingredients. Unless otherwise indicated, the catalyst concentration was 3% of the vinyl compounds.

EXAMPLE 1

| Ingredient: | Parts by weight |
|---|---|
| Resinous polyester described under B1 | 250 |
| Inert solvent [1] | 500 |
| Styrene | 62.5 |
| Benzoyl peroxide | 1.88 |

[1] The inert solvent is a hydrocarbon, preferably one having a high proportion of aromatics. Examples are xylol, Solvesso 100, Solvesso 150 and Velsicol 45. The characteristics of these solvents are delineated hereinafter.

Eleven hours after the addition of the styrene the product formed a gel, which could be redissolved by the addition of more inert solvent. The amount of styrene used is equivalent to 25% based on the resinous polyester.

The results of analysis made during the progress of the reaction are tabulated below:

| Reaction time in hours | Viscosity | Percent Non-Volatile | Percent Styrene Reacted | Percent Styrene in Product |
|---|---|---|---|---|
| 1 | E | 32.7 | 25.0 | 5.87 |
| 4 | H | 34.6 | 50.0 | 11.10 |
| 11 | gelled | 36.7 | 77.6 | 16.20 |

EXAMPLE 2

| Ingredient: | Parts by weight |
|---|---|
| Resinous polyester described under B1 | 125 |
| Inert solvent | 125 |
| Styrene | 162.5 |
| Alpha methyl styrene | 87.5 |
| Benzoyl peroxide | 7.5 |

A clear gel formed shortly after addition of the styrene and alpha methyl styrene was completed. The percentage of vinyl monomers based on the polyester was 200, and the ratio of styrene to alpha methyl styrene was 65 to 35. The gel was redissolved by additional inert solvent. The use of alpha methyl styrene as a modifier is desirable to increase the degree of reaction between the unsaturated fatty acid radicals and the vinyl compound. It is believed that this is effected by both slowing down the rate of reaction between the styrene molecules and by limiting the chain length of the vinyl polymers. In other words, the alpha methyl styrene acts at least in part as a polymerization retarder or as a "short stop" for styrene polymerization. Thus, since the reaction rate between molecules of styrene is decreased considerably and since any styrene polymers are of limited length and complexity, both the low molecular weight polymers and the monomers are capable of reacting with the unsaturated fatty acid radical. The presence of a proper catalyst hastens and directs the copolymerization of a vinyl compound and the unsaturated acid under these circumstances, in preference to the homopolymerization of the styrene constituents.

EXAMPLE 3

| Ingredient: | Parts by weight |
|---|---|
| Resinous polyester described under B1 | 250 |
| Inert solvent | 500 |
| Styrene | 40.63 |
| Alpha methyl styrene | 21.88 |
| Benzoyl peroxide | 1.88 |

This reaction was maintained for about 24 hours after addition of the vinyl monomers without signs of gelling. On analysis it had the following characteristics.

| Reaction time in hours | Viscosity | Percent Styrene Reacted | Percent Styrene in product | Percent Non-volatile material |
|---|---|---|---|---|
| 1 | A | 18.4 | 4.4 | 32.2 |
| 3½ | B | 29.0 | 6.74 | 33.3 |
| 5 | B-C | 42.2 | 9.52 | 34.0 |
| 8¼ | C | 55.3 | 12.2 | 35.0 |
| 12 | D-E | 61.8 | 13.4 | 35.5 |
| 15¾ | F | 65.8 | 14.1 | 35.8 |
| 19¼ | H | 68.6 | 14.6 | 36.0 |
| 23¾ | I | 71.0 | 15.1 | 36.2 |

The styrene monomers represent about 25% of the resinous polyester. The finished resin was clear. It had an acid value of 25.7 and a color of 9.5.

EXAMPLE 4

| Ingredient: | Parts by weight |
|---|---|
| Resinous polyester described under B1 | 250 |
| Inert solvent | 500 |
| Styrene | 162.5 |
| Alpha methyl styrene | 87.5 |
| Benzoyl peroxide | 7.5 |

By continuing the reaction for twenty-four hours after addition of the vinyl monomers, a clear gel was formed, which could be redissolved by adding more inert solvent. The vinyl monomers 100% of the resinous polyester. In the course of the reaction the following analytical data were produced:

| Reaction time in hours | Viscosity | Percent Styrenes Reacted | Percent Styrenes in Product | Percent Non-Volatile |
|---|---|---|---|---|
| 2 | I-J | 19.8 | 16.5 | 36.5 |
| 4 | K-L | 28.75 | 22.4 | 38.1 |
| 8 | U | 46.1 | 31.5 | 41.0 |
| 11½ | W | 53.8 | 35.0 | 42.3 |
| 15 | Z | 62.2 | 38.4 | 43.7 |
| 18½ | Z-1 | 68.3 | 40.6 | 44.7 |
| 22 | Z-4 | 73.6 | 42.4 | 45.6 |
| 24 | Gelled | | | |

EXAMPLE 5

Ingredient: Parts by weight
- Resinous polyester described under B1 _____ 250
- Inert solvent _____ 500
- Styrene _____ 81.25
- Alpha methyl styrene _____ 43.75
- Benzoyl peroxide _____ 3.75

The vinyl momomers represent 50% of the resinous polyester. No gel was present after a reaction period of twenty-four hours. The product had a color of 9.5 and an acid value of 21.7. The analytical results on samples taken during the reaction are tabulated below:

| Reaction time in hours | Viscosity | Percent Styrenes Reacted | Percent Styrenes in Product | Percent Non-Volatile |
|---|---|---|---|---|
| 2 | B-C | 34.7 | 14.8 | 33.5 |
| 4½ | D | 39.6 | 16.5 | 34.2 |
| 8 | E-F | 52.7 | 20.9 | 36.1 |
| 12 | G | 61.7 | 23.6 | 37.4 |
| 16 | I-J | 67.3 | 25.2 | 38.2 |
| 20 | L-M | 72.2 | 26.5 | 38.9 |
| 24 | Q-R | 73.6 | 26.9 | 39.1 |

EXAMPLE 6

Ingredient: Parts by weight
- Resinous polyester described under B1 __ 250
- Inert solvent _____ 500
- Styrene _____ 130
- Alpha methyl styrene _____ 70
- Benzoyl peroxide _____ 6

The vinyl monomers represent about 80% of the resinous polyester. No gel was observed after a reaction time of twenty-four hours. The product was clear and produced a hard tough transparent film. Analytical data are tabulated below:

| Reaction time in hours | Viscosity | Percent Styrenes Reacted | Percent Styrenes in Product | Percent Non-Volatile |
|---|---|---|---|---|
| 2 | E | 44.9 | 26.5 | 35.5 |
| 4 | G | 51.1 | 29.0 | 36.5 |
| 8 | L | 62.5 | 33.4 | 38.8 |
| 12 | Q | 68.5 | 35.4 | 40.0 |
| 16 | T | 73.5 | 37.0 | 41.0 |
| 20 | U-V | 80.5 | 39.2 | 42.4 |
| 24 | V-W | 84.0 | 30.2 | 42.9 |

The finished product had a color of 9.5 and an acid value of 18.5.

EXAMPLE 7

Ingredient: Parts by weight
- Resinous polyester described under B1__ 250
- Inert solvent _____ 500
- Styrene _____ 130
- Alpha methyl styrene _____ 70
- Ditertiary butyl peroxide _____ 6

The proportion of reacting ingredients is the same as that of Example 6, the only difference is in the substitution of ditertiary butyl peroxide as a polymerization catalyst for the benzoyl peroxide used in the previous examples. The superiority of ditertiary butyl peroxide as a catalyst to increase the rate of reaction and to shift the equilibrium point toward completion, without forming a gelled product, is shown in the reaction rate results below:

| Reaction time in hours | Viscosity | Percent Styrenes Reacted | Percent Styrenes in Product | Percent Non-Volatile |
|---|---|---|---|---|
| 3 | K | 68.0 | 35.2 | 39.9 |
| 7 | U | 80.4 | 39.1 | 42.4 |
| 10 | V-W | 86.0 | 40.7 | 43.5 |
| 14 | W | 88.9 | 41.6 | 44.1 |
| 18 | X-Y | 91.4 | 42.2 | 44.6 |

From these data it is readily apparent that after seven hours, the reaction proceeded to a stage comparable to that reached in 20 hours with benzoyl peroxide as a catalyst, and that the percentage of styrenes reacted and present in the product was appreciably higher in the completed reaction.

In the next group of examples, the unsaturated fatty acid ester of the lower molecular weight polyphenylether alcohol described under B2 was used.

EXAMPLE 8

Ingredient: Parts by weight
- Resinous polyester described under B2 _____ 250
- Inert solvent _____ 500
- Styrene _____ 62.5
- Ditertiary butyl peroxide _____ 1.88

The styrene represents about 25% of the polyester. The reaction rate data are given below:

| Time in hours | Viscosity | Percent Styrenes Reacted | Percent Styrenes in Product | Percent Non-Volatile |
|---|---|---|---|---|
| 2 | A-B | 55.8 | 12.2 | 35.1 |
| 4¾ | B | 62.3 | 13.5 | 35.6 |
| 7¾ | C | 77.9 | 16.3 | 36.8 |
| 12 | C | 81.2 | 16.9 | 37.1 |
| 16 | D | 88.2 | 18.1 | 37.6 |
| 19 | D-E | 90.8 | 18.5 | 37.8 |

This product had a color of 7.5, and acid value of 28.6 and was clear on drying.

EXAMPLE 9

Ingredient: Parts by weight
- Resinous polyester described under B2 _____ 200
- Inert solvent _____ 400
- Styrene _____ 125
- Ditertiary butyl peroxide _____ 3.75

The styrene represents 62.5 per cent of the resinous polyester. The data taken during this reaction are as follows:

| Reaction time in hours | Viscosity | Percent Styrene Reacted | Percent Styrene in product | Percent Non-Volatile |
|---|---|---|---|---|
| 2 | N | 85.7 | 34.9 | 42.3 |
| 4 | T | 93.3 | 36.9 | 43.6 |
| 8 | U-V | 93.9 | 37.0 | 43.7 |
| 11 | V-W | 96.2 | 37.5 | 44.1 |

This product had a color of 6.5, an acid value of 22.4 and was clear on drying.

EXAMPLE 10

Ingredient: Parts by weight
- Resinous polyester described under B2__ 200
- Inert solvent _____ 400
- Styrene _____ 130
- Alpha methyl styrene _____ 70
- Ditertiary butyl peroxide _____ 6

The vinyl monomers are equivalent to 100% of the polyester. The analytical data on this reaction are tabulated below:

| Reaction time in hours | Viscosity | Percent Styrenes Reacted | Percent Styrenes in Product | Percent Non-Volatile |
|---|---|---|---|---|
| 1 | B | 56.4 | 36.0 | 39.1 |
| 4 | F | 74.4 | 42.7 | 43.6 |
| 9 | I | 82.7 | 45.3 | 45.7 |
| 12 | K | 85.6 | 46.2 | 46.4 |
| 17 | K-L | 85.6 | 46.2 | 46.4 |

The product had a color of 9.5, and the dried film was clear.

The advantage of using a modifier or "short stop" agent, such as alpha methyl styrene, is typified by a comparison of results obtained in Example 10, with a reaction using the same proportion of resinous polyester, vinyl monomer, inert solvent and catalyst. The only difference was that the vinyl monomer consisted solely of styrene without any alpha methyl homologue. The conditions of the reaction were maintained as uniform as possible. Where no alpha methyl styrene was present, and the styrene ratio was equal to that of the polyester, the product gelled about thirty minutes after adding the styrene and catalyst mixture. By increasing the amount of inert solvent, however, it was possible to redissolve the gel and continue the reaction to approximately the same degree of completion as was effected in the presence of the alpha methyl styrene modifier. The percentage of solids in the sample containing the modifier was higher than that in which no "short stop" was employed.

Although the inert solvent is not believed to take part in the reaction between the vinyl compound and the unsaturated radical of the fatty acids, the quantity of solvent present has some bearing on the degree of completeness that the reaction reaches. An experiment was run in which the ratio of polyester, styrene, alpha methyl styrene and catalyst were the same as in Example 10, but the ratio of solvent to the other ingredients was cut in half. The product gelled about thirty minutes after addition of the styrene, alpha methyl styrene and catalyst mixture was complete. The gel was clear and could be redissolved by adding more inert solvent.

Since clear products were obtained in each instance when monomeric vinyl compounds and polymerization catalysts were added slowly to a solution of the resinous polyester of a polyphenylether alcohol and unsaturated fatty acid, control experiments were run in an attempt to determine whether the vinyl monomers copolymerized with themselves only or whether copolymerization with the unsaturated fatty acid radical also took place. Accordingly a 65/35 mixture of styrene and alpha methyl styrene, respectively, and 3% catalyst were added slowly to an inert solvent, and reacted for about fifteen hours. The conditions of this reaction were kept as near as possible to those in which the polyester were also employed.

EXAMPLE 11

Ingredient: Parts by weight
Inert solvent _____ 600
Styrene _____ 195
Alpha methyl styrene _____ 105
Ditertiary butyl peroxide _____ 9

| Reaction time in hours | Percent Styrenes Reacted | Percent Non-Volatile |
|---|---|---|
| 1 | 76.6 | 25.5 |
| 4 | 89.6 | 20.8 |
| 7¾ | 96.1 | 32.0 |
| 11¾ | 96.4 | 32.1 |
| 14¾ | 97.8 | 32.6 |

To aliquots of this styrene-alpha methyl styrene copolymer solution were added various amounts of a 50% solution of the resinous polyesters described under B1 and B2 hereof. In each instance the solution was clear, but upon drying, all films were opalescent, even though the ratio of polyester to styrene-alpha methyl styrene copolymer was 2 to 1. This opalescence indicates incompatability between the styrene-alpha methyl styrene copolymer and the polyesters formed by reacting an unsaturated fatty acid and a polyphenylether alcohol, described previously. The opalescence acts also as an indirect indication that a reaction between the unsaturated fatty acid radical of the polyester and the vinyl compounds was effected to at least a slight degree.

In order to effect a copolymerization between the unsaturated fatty acid radicals of the polyester of the polyphenylether alcohol and a vinyl monomer, it is essential that the polyester be in solution during the reaction period and that the vinyl monomer and catalyst mixture be added slowly, and preferably dropwise, to a hot solution of the polyester.

When the polyphenylether alcohol, unsaturated fatty acid ester, monomeric vinyl compounds and catalyst were blended before the reaction was begun, the resulting film was cloudy, indicating incompatability. By first preparing a partial ester of the polyphenylether alcohol and unsaturated fatty acids, and adding the vinyl monomer and catalyst dropwise to this partial ester clear films can be produced.

EXAMPLE 12

Ingredient: Parts by weight
Soya bean oil fatty acids _____ 224
Dehydrated castor oil acids _____ 56
Polyphenylether alcohol M. W. 1400–1600 _____ 348
Styrene _____ 182
Alpha methyl styrene _____ 98
Ditertiary butyl peroxide _____ 8.4

The mixture of fatty acids and polyphenylether alcohol had an acid number of 90 before reaction. This mixture was heated to 180° C. in about 45 minutes. At this point the product had an acid number of 49. The temperature was lowered to 148° C. in 15 minutes and a mixture of styrene, alpha methyl styrene and catalyst was added dropwise over a three hour period. A reaction temperature of 140–150° C. was maintained for an additional eight hours. At the end of this period the tempertaure was raised to about 240° C. and held between 235° C. and 245° C. for 2½ hours. During this latter holding period 37 ml. of distillate was collected in the Stark and Dean unit. Nine ml. were water and the remainder was presumably unreacted styrenes. This copolymer had an acid number of 6.8. It was completely dissolved when 900 parts of xylol were added, forming a clear solution having 49.2% non-volatile material. This solution had a viscosity of U–V and a color of 10.5.

For comparative purposes a polyester was first prepared with the same proportions of the same polyphenylether alcohol and unsaturated fatty acids. The polyester had an acid number of 21.6. A 49.1% solution in xylol had a viscosity of B and a color of 5.5. To 1018 parts of the xylol solution of polyester a mixture of 162.5 parts of styrene, 87 parts of alpha methyl styrene and 7.5 parts of ditertiary butyl peroxide was added dropwise over a three hour period, while maintaining a temperature of 135°–145° C. The vinylation reaction was continued over an additional 12½ hour period. The final copolymer had an acid number of 17.8 based on the non-volatile material. The solution contained a non-volatile content of 56.8%, had a color of 5.5 and a viscosity of M.

Another copolymer was prepared by first styrenating the acids and then esterifying the vinylated acids with a polyphenylether alcohol.

The same acids, vinyl monomers and catalyst were used in the same proportions as those described in Example 12. The blended acids were heated to 145° C. in about 20 minutes and a mixture of styrene, alpha methyl styrene and ditertiary butyl peroxide was added dropwise over a period of three and a half hours. This reaction was continued for an additional eleven hours at 140–150° C. At the end of this time the temperature was raised to 190° C. in 30 minutes and held there for an hour. Fifty nine ml. of distillate, consisting entirely of unreacted styrenes were collected. The product had an acid number of 96.5 a viscosity slightly greater than Z–6, a color of 6, an equivalent weight of 582, and a styrene content of 48.4%. To esterify the vinylated acids, 582 parts thereof were mixed with 384 parts of a polyphenylether alcohol (M. W. 1400–1600) and heated to 237° C. in 40 minutes. The reaction temperature was then held for three hours. The polyester was then cooled to 170° C. and dissolved by adding 930 parts of xylol. This polyester had an acid number of 7.9. A 47.2% solution in xylol had a color of 6.5 and a viscosity of K–L.

If no catalyst is employed and the vinyl monomer is added dropwise to a solution of the polyester or if the polyester, the vinyl monomers and catalysts are all blended in a solution before starting the reaction, the film produced is opalescent, showing incompatibility.

*Reactions with other vinyl compounds*

The examples heretofore disclose reactions of arylvinyl compounds with polyesters of unsaturated fatty acids. Similar reactions occur when alkyl vinyl compounds are used. The equipment and the techniques employed in running these reactions are generally similar to those already described. The vinyl monomer with catalyst was added slowly to a solution of the monobasic unsaturated acid-polyphenylether alcohol ester in an inert solvent. There were some differences in reaction temperature which will be mentioned hereinafter.

EXAMPLE 13

| Ingredient: | Parts by weight |
|---|---|
| Resinous polyester described under B1 | 750 |
| Inert solvent | 1500 |
| Monomeric methyl methacrylate | 375 |
| Alpha pinene | 37.5 |
| Ditertiary butyl peroxide | 11.25 |

The solution of polyester was heated to 100° C. and a mixture of vinyl monomer, alpha pinene and catalyst was added dropwise over a period of 2½ hours. The temperature during this period was maintained at 97–100° C. and held there for an additional eleven hours. The unreacted monomer was distilled off and the solution was allowed to cool slowly to room temperature. The solution was clear and homogeneous. It had a non-volatile content of 44%, a viscosity of W, a color of 5.5 and an acid value based on non-volatile of 16.8.

Another copolymer was prepared using the polyester described under B2, with the same quantities of polyester and other reactants. The vinyl monomer, alpha pinene and catalyst mixture was added over a period of 3½ hours and the reaction was continued for an additional twelve hours at a temperature of 100–105° C. The unreacted monomer was removed by distillation. By calculation, it was found that 73.33% of the methyl methacrylate reacted. The final solution had a non-volatile content of 40.5%, a viscosity of D–E, a color of 8.5 and an acid number based on the non-volatiles of 29.2, and dried films were clear and homogeneous.

In both these reactions small amounts, up to 10% of the vinyl monomer, of alpha pinene were used as a "short stop" or polymerization inhibitor to slow down the homopolymerization of the vinyl compounds.

EXAMPLE 14

| Ingredient: | Parts by weight |
|---|---|
| Resinous polyester described under B2 | 500 |
| Inert solvent | 1000 |
| Monomeric n-butyl methacrylate | 250 |
| Ditertiary butyl peroxide | 7.5 |

The homo-polymerization of n-butyl methacrylate is sufficiently slow as to require no polymerization inhibitor. The vinyl monomer and catalyst mixture was added in 2¾ hours, to a solution of the polyester which was held at a temperature of 145° C. This reaction was continued at about the same temperature for an additional 14½ hours, after which the unreacted monomer was removed by distillation. The finished solution had a non-volatile content of 38.5%, a viscosity of A, a color of 6 and an acid number based on the non-volatile of 28.5.

Each of the methacrylate ester copolymers of the polyester of an unsaturated acid when flowed onto tin plate and baked at 300° F. for 15 minutes, formed a continuous film with excellent resistance to alkali and water. The films had exceptional flexibility and adhesion to metal substrates.

D. *Esterification of polyphenyl polyalcohol ethers with vinyl reacted unsaturated fatty acids*

In preparing useful film forming compositions, unsaturated fatty acids can first be reacted with a vinyl monomer and subsequently esterified with a polyphenyl polyhydric ether alcohol described under section B herein.

It is known that unsaturated fatty acids which contain conjugated double bonds can be readily copolymerized by special techniques with aromatic vinyl monomers, such as styrene, to form homogeneous and clear reaction products. U. S. Patent 2,190,906 relates to compositions of this type.

It is also generally recognized that mixtures of conjugated and non-conjugated unsaturated fatty acids containing not more than 35% of conjugated olefinic linkages can be reacted with styrene or styrene and an alpha substituted styrene, such as alpha methyl styrene, as disclosed in U. S. Patent 2,468,748.

Unsaturated fatty acids with non-conjugated double bonds do not react readily with vinyl monomers to form homogeneous copolymers. Copolymers of these acids have been formed by first partially oxidizing non-conjugated drying oils and subsequently reacting them with a vinyl monomer in accordance with the teachings of U. S. Patent 2,382,213. Copolymerization of non-conjugated fatty acids can also be accomplished, according to the prior art, by blending an ethylene alpha-beta dicarboxylic acid, and mixed fatty acid esters one of which comprises a hydroxylated unsaturated fatty acid ester, and reacting this mixture with an aromatic vinyl compound, as disclosed in U. S. Patent 2,482,086. Maleic acid anhydride in concentrations of 2 to 5% will serve as the ethylene alpha-beta dicarboxylic acid. The presence of the dibasic acid may, under some circumstances, be detrimental. An example of this is in the present process in which the resinous polyphenylether alcohols described under section B hereof gel rapidly at the elevated temperatures required for esterification, if small amounts of dibasic acid are combined with the vinylated unsaturated fatty acid.

I have found that the use of from about 0.5% to 5% of an unsaturated monobasic acid having from 4 to about 6 carbon atoms results in clear and homogeneous products in the copolymerization reaction involving an unconjugated fatty acid and a vinyl monomer, and that the resulting copolymer can be used to esterify a resinous polyphenylether alcohol, such as that described under section B herein, without gel formation during the esterification process.

The following examples describe the ingredients and methods used to form copolymers of monomeric vinyl compounds and unsaturated fatty acids and subsequently esterifying the copolymers with resinous polyphenylether alcohols.

EXAMPLE 15

| Ingredient: | Parts by weight |
| --- | --- |
| Dehydrated castor oil fatty acids | 1400 |
| Monomeric styrene | 1040 |
| Ditertiary butyl peroxide | 31.2 |

The apparatus used in this and subsequent examples was the same as that already described under Example 1.

The fatty acids were heated to 145° C. and a mixture of styrene and polymerization catalyst was added dropwise over a three hour period. The reaction mixture was allowed to reflux at 140–150° C. for an additional 7½ hours, after which the unreacted styrene was removed by distillation. The product was clear and it had a viscosity slightly greater than Z–6, an acid number of 113, an equivalent weight of 496 and a color of 4.5. About 95.7% of the styrene was reacted.

A polyester was prepared by reacting 248 parts of the vinylated dehydrated castor oil fatty acids from Example 15 with 174 parts of a resinous polyphenylether alcohol formed by reacting bisphenol A with epichlorohydrin. The polyphenylether alcohol and vinylated acids were heated together for 65 minutes to a temperature of 220° C., and maintained between 220–225° C. for an additional 35 minutes. Water of esterification was removed as it was formed. The polyester had an acid number of 29.0, and was completely soluble in Solvesso 150. A 30% solution had a viscosity greater than Z–6 and a color of 7. The resinous polyphenylether alcohol employed in the esterification reaction had a molecular weight of 1400–1600 and an epoxy equivalent of 905–985.

Another polyester using the same vinylated acids and a polyphenylether alcohol having a molecular weight of 850–950 and an epoxide equivalent of 450–525 was prepared by heating a mixture of 248 parts of vinylated dehydrated castor oil acids and 132 parts of the resinous polyphenylether alcohol to 223° C. in 100 minutes and holding this mixture an additional 30 minutes at 220–225° C. This composition had an acid number of 23.0. A 50.4% solution in Solvesso 150 and a viscosity slightly greater than Z–6 and a color of 5.5.

EXAMPLE 16

Oiticica oil fatty acids were vinylated by heating the acids to 145° C. and adding, dropwise, a mixture of styrene and ditertiary butyl peroxide over a period of 3¼ hours. A reaction temperature of 140–150° C. was maintained for an additional 27 hours, after which the unreacted styrene monomer was removed by distillation. About 80.8% of the styrene was reacted. This copolymer had an acid value of 109, an equivalent weight of 514, a viscosity greater than Z–6 and a color of 16. The proportions of ingredients used for this reaction were the same as those disclosed under Example 15.

The unsaturated fatty acids can be reacted with other monomeric vinyl compounds to produce copolymers which can then be reacted with a resinous polyphenylether alcohol to form a polyester.

EXAMPLE 17

| Ingredient: | Parts by weight |
| --- | --- |
| Dehydrated castor oil fatty acids | 1400 |
| n-Butyl methacrylate | 1040 |
| Ditertiary butyl peroxide | 31.2 |

The fatty acids were heated to 160° C. and the n-butyl methacrylate and catalyst mixture was added dropwise over a period of three hours. The reaction temperature was maintained over an additional 8¾ hour period, after which the unreacted monomer was distilled from the reaction. About 90.6% of the monomer was reacted. The product had an acid number of 100.5, an equivalent weight of 558, a viscosity of L and a color of 8.5.

A polyester was formed by reacting 279 parts of the vinylated acids with 174 parts of a resinous polyphenylether alcohol having a molecular weight of 1400–1600. This mixture was heated to 230° C. in 30 minutes and held at 220–240° C. for one hour. The polyester had an acid number of 30.2. A 50% solution in Velsicol 45 had a viscosity of W and a color of 11.5.

Another polyester was formed with 279 parts of the vinylated acids and 132 parts of a resinous polyphenylether alcohol having a molecular weight of 850–950. The ingredients were blended and heated to 225° C. in 45 minutes. A reaction temperature of 220–240° C. was maintained for an additional 2¼ hours. This polyester had an acid number of 17.1. A 54% solution in Velsicol 45 had a viscosity of T and a color of 11.5.

EXAMPLE 18

| Ingredient: | Parts by weight |
| --- | --- |
| Dehydrated castor oil fatty acids | 1400 |
| Monomeric vinyl toluene | 1040 |
| Ditertiary butyl peroxide | 31.2 |

The fatty acids were heated to 160° C. and a mixture of vinyl toluene and catalyst was added dropwise over a three hour period. The reaction temperature was maintained for an additional six hours after which the unreacted monomer was removed by distillation at a temperature as high as 215° C. About 93.5% of the monomer was reacted. This copolymer had an acid number of 113.5, an equivalent weight of 494, a viscosity greater than Z-6 and a color of 8.5.

A polyester was formed by reacting 247 parts of this vinylated fatty acid with 132 parts of a resinous polyphenylether alcohol having a molecular weight of 850–950. A mixture of the ingredients was heated to 228° C. in 35 minutes and held between 225 and 230° C. for two additional hours. The polyester had an acid number of 14.3. A 54.7% solution in Velsicol 45 had a viscosity greater than Z-6 and a color of 12.5.

Mixed polyesters can be prepared with the vinylated dehydrated castor oil, a resinous polyphenylether alcohol, and acids from drying or semi-drying oils. An example of a composition of this type is given below.

EXAMPLE 19

| Ingredient: | Parts by weight |
|---|---|
| Styrene-dehydrated castor oil acid copolymer | 124 |
| Soya fatty acids | 70 |
| Resinous polyphenylether alcohol | 174 |

These ingredients were heated to 225° C. in 40 minutes and maintained at 220–225° C. for an additional 100 minutes. The mixed ester dissolved completely in 368 parts of Solvesso 150, forming a solution having 50.4 per cent non-volatile material, a viscosity slightly less than Z-6 and a color of 6.5. The polyester had an acid number of 18.5.

Another sample was prepared in which linseed oil fatty acids were substituted for the soya oil acids. The ratio of ingredients was the same as that described in Example 19. This product had an acid number of 21.3. It was soluble in Solvesso 150. A 50.5% solution had a viscosity greater than Z-6 and a color of 9.5. In preparing this polyester the ingredients were heated to 220° C. in one hour and maintained at 220–230° C. for an additional fifty minutes.

*Preparation of styrenated mixed fatty acids*

A mixture of a conjugated and non-conjugated fatty acids can first be copolymerized with a mixture of vinyl monomers, such as styrene and alpha methyl styrene, and the resulting copolymer esterified with a resinous polyphenylether alcohol.

EXAMPLE 20

| Ingredient: | Parts by weight |
|---|---|
| Soya oil fatty acids | 1120 |
| Dehydrated castor oil fatty acids | 280 |
| Styrene | 608 |
| Alpha methyl styrene | 327 |
| Ditertiary butyl peroxide | 28 |

The mixture of soya fatty acids and dehydrated castor oil fatty acids was heated to 145° C. in 30 minutes. A temperature of 140–150° C. was maintained while slowly adding the mixture of vinyl monomers and catalyst, over a period of three hours. The reaction was permitted to proceed for eight additional hours at the above range of temperature. At this time the unreacted vinyl monomer was distilled from the mixture by raising the temperature to 200° C. in 30 minutes and maintaining it at approximately that point for an additional thirty minutes under a blanket of inert gas. The reaction product had an acid number of 130, an equivalent weight of 432, a viscosity of Z-1 and a color of 4.5.

EXAMPLE 21

| Ingredient: | Parts by weight |
|---|---|
| Linseed oil fatty acids | 1120 |
| Dehydrated castor oil fatty acids | 280 |
| Styrene | 608 |
| Alpha methyl styrene | 327 |
| Ditertiary butyl peroxide | 28 |

The mixture of fatty acids was heated to 145° C. and then the mixture of styrene, alpha methyl styrene and catalyst was added dropwise over a three hour period. The temperature was maintained at 140–150° C. for 21¼ hours. At the end of this period the excess styrenes were distilled from the reaction mixture at a temperature as high as 190° C. About 93.3% of the vinyl monomers reacted. The copolymer had an acid number of 120, an equivalent weight of 467, a viscosity slightly greater than X and a color of 12.

A polyester was formed by reacting 233.5 parts of this copolymer with 174 parts of a resinous polyphenylether alcohol having a molecular weight of 1400–1600. A mixture of the ingredients was heated to 220° C. in 30 minutes and held at 220–240° C. for about 1½ hours. The polyester had an acid number of 16.6. A 49.2% solution in Solvesso 100 had a viscosity of P and a color of 9.5.

Attempts to styrenate mixtures of conjugated and non-conjugated unsaturated fatty acids by the use of styrene without alpha methyl styrene as a styrene polymerization inhibitor resulted in products which were very cloudy under the reaction condition employed, indicating incompatibility.

The mixed styrenated fatty acids described in Example 21 were esterified with resinous polyphenylether alcohols having molecular weights ranging from about 850 to about 2500. In each instance the esterification reaction was carried out by heating the ingredients between 220 and 240° C. for at least an hour, and removing the water of esterification as it formed through the use of a Stark and Dean trap connected to a condenser.

EXAMPLE 22

| Ingredient: | Parts by weight |
|---|---|
| Styrenated mixed fatty acids of Example 19 | 216 |
| Resinous polyphenylether alcohol, M. W. 1400–1600 | 174 |

The mixture was heated to 220° C. in 30 minutes and held at 220–225° C. for an hour, then the temperature was raised to 240° C. and held an additional 30 minutes. The polyester had an acid number of 14.9 A 49.7% solution in Solvesso 150 had a viscosity of X–Y and a color of 5.5.

Equivalent amounts of the same non-volatile materials when heated to 240° C. in one hour, and maintained at that temperature for an additional two hours, had an acid number of 8. The polyester was dissolved in 332 parts of Velsicol #45. This solution had a solids content of 70.0%, a viscosity considerably greater than Z-6 and a color of 7.

In another test 432 parts of styrenated mixed fatty acids of Example 20 were reacted with 174 parts of the resinous polyphenylether alcohol having a mol. wt. of 850 to 950. The mixture was heated to 230° C. in 20 minutes and the reaction was continued two more hours at approximately this temperature. The polyester had an acid number of 30.8. It was dissolved in 404 parts of Velsicol #45 to form a 60% solution, with a color of 10.0 and a viscosity of Z-1.

Two hundred sixteen parts of styrenated fatty acids from Example 20 were reacted with 188 parts of a resinous polyphenylether alcohol having a mol. wt. of about 2500 by heating the mixture to 220° C. in 35 minutes and holding at that temperature for about 35 minutes. The temperature was then raised to 240° C. and held an additional 35 minutes. The polyester had an acid number of 14.9. The product was dissolved in 404 parts of Solvesso 150 to form a 50.0% solution having a viscosity much greater than 6 and a color of 8.5.

*Styrenation of non-conjugated unsaturated fatty acids*

Several unsuccessful attempts were made to copolymerize a mixture containing a non-conjugated unsaturated fatty acid with styrene and alpha methyl styrene in the presence of a catalyst. In each such attempt the product was cloudy indicating an incompatible product.

Non-conjugated fatty acids can be vinylated, however, by adding from about 0.5 to about 5% by weight, based on the non-conjugated fatty acid, of a monobasic unsaturated carboxylic acid having from 4 to 6 carbon atoms to the fatty acids. A mixture of styrene, alpha methyl styrene and catalyst is added slowly, and preferably dropwise, to the heated acid mixture to produce copolymers of the vinyl compounds and fatty acids. These copolymers can be reacted with a resinous polyphenylether alcohol without gel formation during the esterification procedure.

EXAMPLE 23

| Ingredient: | Parts by weight |
|---|---|
| Soya oil fatty acids | 1372 |
| Sorbic acid | 28 |
| Styrene | 608 |
| Alpha methyl styrene | 327 |
| Ditertiary butyl peroxide | 28 |

The soya oil acids and sorbic acid mixture was heated to 145° C. and maintained at approximately this temperature while slow, dropwise, addition of styrene, alpha methyl styrene and catalyst was made over a three hour period. A temperature of 140–150° C. was maintained for an additional eight hours, after which the unreacted styrenes were removed by distillation. About 89.5% of the vinyl compound reacted. The finished copolymer was clear, and had an acid number of 134, an equivalent weight of 418, a viscosity of Y-Z and a color of 7.5.

Four hundred seventeen parts of this copolymer were reacted with 348 parts of a resinous polyphenylether alcohol having a mol. wt. of 1400–1600. This mixture was heated to about 220° C. in 45 minutes and maintained at approximately this temperature for an hour. The temperature was then raised to 240° C. and held for 30 minutes. This polyester had an acid number of 15.6. It was dissolved in 510 parts of Solvesso 100 to form a solution containing 60% non-volatile material. The solution had a viscosity of Z-1 to Z-2 and a color of 7.5.

EXAMPLE 24

| Ingredient: | Parts by weight |
|---|---|
| Soya oil fatty acids | 1393 |
| Sorbic acid | 7 |
| Styrene | 608 |
| Alpha methyl styrene | 327 |
| Ditertiary butyl peroxide | 28 |

The only difference in the process from that described in Example 23, was that the reaction was carried over a period of seven instead of eight hours. About 90.2% of the styrenes were reacted. This product had an acid number of 129.5, an equivalent weight of 433, a viscosity of Z and a color of 6.5. The sorbic acid in this example represents 0.5% of the weight of soya oil acids.

EXAMPLE 25

| Ingredient: | Parts by weight |
|---|---|
| Soya oil fatty acids | 1372 |
| Crotonic acid | 28 |
| Styrene | 608 |
| Alpha methyl styrene | 327 |
| Ditertiary butyl peroxide | 28 |

A mixture of the unsaturated acids was heated to 145° C. after which a mixture of the vinyl monomers and catalyst was added dropwise over a period of 3½ hours. A temperature of 140–150° C. was maintained for twenty one hours, after which the unreacted monomer was distilled from the copolymer by raising the temperature to 190° C. This copolymer had an acid number of 122.2, an equivalent weight of 458, a viscosity of Y-Z and a color of 7.5. About 93.6% of the styrenes reacted.

A polyester was formed by reacting 229 parts of this copolymer with 174 parts of a resinous polyphenylether alcohol, having a molecular weight of 1400–1600, by heating a mixture of the ingredients to 240° C. in 45 minutes and holding at such temperature for two hours. The polyester had an acid number of 7.1. A 50% solution in Solvesso 150 had a viscosity of V-W and a color of 6.5.

Another polyester was formed by heating 523 parts of styrenated soya oil fatty acids with 174 parts of a resinous polyphenylether alcohol. The reaction temperature of 220–240° C. was reached in 25 minutes and held there for two hours. This polyester had an acid number of 32. A 60% solution in Velsicol 45 had a viscosity of V and a color of 10.

EXAMPLE 26

| Ingredient: | Parts by weight |
|---|---|
| Linseed oil fatty acids | 1372 |
| Sorbic acid | 28 |
| Styrene | 608 |
| Alpha methyl styrene | 327 |
| Ditertiary butyl peroxide | 28 |

A mixture of the unsaturated acids was heated to 145° C. and then a mixture of styrene, alpha methyl styrene and peroxide catalyst was added dropwise over a three hour period. A temperature of 140–150° C. was maintained for 13¾ hours. The unreacted vinyl monomers were then removed by distillation. About 87.3% of the styrenes were reacted. The copolymer had an acid number of 121.3, an equivalent weight of 462, a viscosity of Z to Z-1 and a color of 11.5.

To form a polyester, 231 parts of this copolymer were mixed with 174 parts of a resinous polyphenylether alcohol having a molecular weight of 1400–1600 and heated to 240° C. in 35 minutes. This reaction temperature was maintained for two hours. The polyester had an acid number of 13.4. A 50% solution in Solvesso 150 had a viscosity of W-X and a color of 7.5.

Another polyester was formed by reacting 244 parts of a styrenated linseed oil fatty acid with 174 parts of a resinous polyphenylether alcohol.

A temperature of 240° C. was reached in 45 minutes and maintained between 235 and 240° C. for 2½ hours. This polyester had an acid number of 10.2. A 59.7% solution in Solvesso 100 had a viscosity of X–Y and a color of 11.0.

The unsaturated fatty acids can be vinylated separately, then blended or mixed and finally reacted with a resinous polyphenylether alcohol.

EXAMPLE 27

| Ingredient: | Parts by weight |
|---|---|
| Styrenated oiticica fatty acids | 62.4 |
| Styrenated mixture of soya and dehydrated castor oil fatty acids of Example 19 | 162 |
| Resinous polyphenylether alcohol | 174 |

This mixture was heated to 230° C. in 35 minutes and a temperature of 227–230° C. was maintained for 1¾ hours. The polyester had an acid number of 12.4. A 52.3% solution in Velsicol 45 had a viscosity slightly less than Z–6 and a color of 14.

It is apparent from these examples that there are several methods that can be employed to make my new and novel copolymers of vinyl compounds, polyphenylether alcolhols and unsaturated fatty acids. This result can be accomplished by first forming a polyester with a resinous polyphenylether alcohol and an unsaturated fatty acid and subsequently treating the polyester with a vinyl monomer and a catalyst.

The unsaturated fatty acids may first be treated with a vinyl monomer and then esterified with a polyphenylether alcohol. Another alternative is to form a partial ester of the unsaturated fatty acids and polyphenylether alcohols, and treat the partial ester with vinyl monomers and then complete the esterification reaction.

In the examples the resinous polyphenylether alcohol is a reaction product of 2,2 bis-(p-hydroxy phenyl) propane and epichlorohydrin. Other resins of this general type can also be used. They can be formed by reacting an epichlorohydrin, or an aliphatic polyepoxy compound with a polyhydric phenol. The polyhydric phenol can have its hydroxyl groups attached to one or to separate benzene rings. The resinous polyphenylether alcohols that result from these reactions usually have terminal epoxy groups. However, the epoxy linkage can be opened to form adjacent aliphatic alcohol groups. The resinous polyphenylether alcohols that can be used are described in U. S. Patents 2,324,483; 2,444,333; and 2,503,726. Mixtures of resinous polyphenylether alcohols described herein can be employed. These compounds can be characterized by the general formula $$(R\!-\!O\!-\!R'\!-\!O\!-\!R)_n$$

in which R is an esterifiable glyceryl radical, i. e. having hydroxy or epoxy groups attached thereto, R' is the hydrocarbon radical of a polyhydric phenol such as the phenylene radical from hydroquinone or the 2,2-bis (phenylene) propane radical from bisphenol A, i. e. 2,2-bis (4-hydroxyphenyl) propane, and $n$ is not less than 1. It can be readily observed from the above general formula that the esterifiable glyceryl radicals and hydrocarbon radicals occur alternately, being separated by ether oxygen atoms.

The unsaturated monobasic fatty acids that are useful in preparing my copolymers include conjugated and non-conjugated natural fatty acids of plant or animal origin and also synthetic unsaturated fatty acids having unsaturated carbon to carbon linkages in which the only non-carbon substituent on the carbon atoms is a hydrogen atom. The preferred fatty acids are those having from 12 to 22 carbon atoms. Mixtures of any of the above acids can be used.

The vinyl compounds used for copolymerization with the unsaturated linkage of the fatty acids comprise alkyl and aryl vinyl monomers. Exemplary compounds that are useful are styrene, alpha methyl styrene, and derivatives thereof in which one or more of the hydrogen atoms of the benzene ring is substituted by a halogen or an alkyl group, such as chlorophenylethylene, or vinyl toluene. Aliphatic vinyl compounds can also be used. Examples of such compounds are low molecular weight alcohol esters of acrylic and alkyl substituted acrylic acids. Mixtures of any of the aryl or alkyl substituted vinyl compounds can be used.

The vinyl monomers can be characterized by the general formula $$W\!-\!\underset{\underset{Z}{|}}{C}\!=\!CH_2$$

in which Z represents hydrogen or a methyl radical and W represents a phenyl radical or a halogen or alkyl substituted phenyl radical or mixtures thereof or an alkoxycarbonyl $$(R''\!-\!O\!-\!\underset{\underset{}{|}}{C}\!=\!O)$$

radical in which the alkyl group, R'', contains 1 to 4 carbon atoms.

In carrying out the reactions I prefer to use an amount of resinous polyphenylether alcohol which is greater than that required to esterify the monobasic fatty acid. The amount of vinyl monomer may be as low as 25% and as high as 200% of the polyphenylether alcohol ester or non-vinylated ester forming materials. A range of 25 to about 100% is preferred.

The examples disclose the use of 3% catalyst based on the vinyl monomers. However, effective results can be produced with a range of from 1 to 10%. Organic peroxides other than those disclosed may also be used. The preferred catalysts are those which have boiling points as high or higher than the vinyl monomers.

Where solvents are employed, they preferably should have a very high proportion of aromatics. Solvents of this type are xylol and those sold under the trade names of Solvesso 100, Solvesso 150, and Velsicol 45. Solvesso 100 and 150, products of Standard Oil Company of New Jersey, have the following general properties:

Solvesso 100.
Distillation Range:

| I. B. P. | 10% | 50% | 90% | Dry Pt. |
|---|---|---|---|---|
| 306° F. | 311° F. | 317° F. | 327° F. | 343° F. |

It has an aniline point of 12° C. an aromatic content of 95–99.5% and a kauri-butanol value of 90, based on a value of 100 for toluol.

Solvesso 150.
Distillation Range:

| I. B. P. | 10% | 50% | 90% | Dry Pt. |
|---|---|---|---|---|
| 375° F. | 380° F. | 387° F. | 392° F. | 398° F. |

The aniline point is 20.1° C. and kauri-butanol value is about 83. It contains from 90 to 95% aromatics.

Velsicol 45—is a product of Velsicol Corporation and has the following characteristics.
Distillation Range:

| I. B. P. | 10% | 50% | 90% | Dry Pt. |
|---|---|---|---|---|
| 370° F. | 380-95° F. | 440-55° F. | 490-505° F. | 540° F. |

Aniline point 26° C. maximum. Kauri-butanol value is 90.

Vinylation of the unsaturated fatty acids can be effected at atmospheric pressure at temperatures ranging from about 20° C. below the boiling point of the vinyl monomer to the boiling or reflux temperature of the vinyl compound. At the higher temperature there appears to be less tendency toward homopolymerization and for that reason the reflux temperature of the vinyl monomer is preferred. When the reaction is carried out under pressures greater than atmospheric, a higher vinylation temperature can be used, and the upper limit is not clearly defined.

The esterification reaction can be carried out at temperatures between about 175° C. and 260° C. The preferred range, however, is from about 220° C. to 240° C.

It is thought that the invention and many of its attendant advantages will be understood from the foregoing description, and it will be apparent that various changes may be made in the matter of the ingredients, their identity and their proportions and in the methods of compounding without departing from the spirit and scope of the invention or sacrificing all of its material advantages, the form hereinbefore described being merely a preferred embodiment thereof.

I claim:

1. An interpolymer of styrene and a polyester of dehydrated castor oil acids and an esterifiable glyceryl polyether of 2,2-bis(4-hydroxyphenyl) propane having alternating glycerol radicals and the hydrocarbon radicals of the phenol united in a chain by ether oxygen atoms between said radicals and having a molecular weight of about from 1400 to 1600, said polyester having said dehydrated castor oil acids and said esterifiable glycerol polyether present in an equivalent weight ratio of 1 to 2 respectively, and said interpolymer containing from 7% to 35% by weight of polymerized styrene.

2. A metal sheet having the composition of claim 1 coated on at least one surface thereof.

References Cited in the file of this patent
UNITED STATES PATENTS

| Number | Name | Date |
|---|---|---|
| 2,596,737 | Tess et al. | May 13, 1952 |